United States Patent
Erdl et al.

(10) Patent No.: US 10,731,818 B2
(45) Date of Patent: Aug. 4, 2020

(54) SCANNER WITH BEAM-DELIMITING DEVICE FOR VEHICLE LIGHTING

(71) Applicant: Bayerische Motoren Werke Aktiengesellschaft, Munich (DE)

(72) Inventors: Helmut Erdl, Flintsbach (DE); Abdelmalek Hanafi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/505,120

(22) Filed: Oct. 2, 2014

(65) Prior Publication Data

US 2015/0016134 A1    Jan. 15, 2015

Related U.S. Application Data

(63) Continuation of application No. PCT/EP2013/053688, filed on Feb. 25, 2013.

(30) Foreign Application Priority Data

Apr. 3, 2012 (DE) .................. 10 2012 205 438

(51) Int. Cl.
*F21S 41/63* (2018.01)
*G02B 26/10* (2006.01)
(Continued)

(52) U.S. Cl.
CPC ........... *F21S 41/635* (2018.01); *F21S 41/147* (2018.01); *F21S 41/16* (2018.01); *F21S 41/25* (2018.01);
(Continued)

(58) Field of Classification Search
CPC .......................... F21S 48/1721; F21S 48/1731
See application file for complete search history.

(56) References Cited

U.S. PATENT DOCUMENTS

| | | | |
|---|---|---|---|
| 4,182,572 A | 1/1980 | Humphrey | |
| 5,124,549 A * | 6/1992 | Michaels | B60Q 1/1423 250/237 R |

(Continued)

FOREIGN PATENT DOCUMENTS

| | | |
|---|---|---|
| CN | 102313230 A | 1/2012 |
| DE | 10 2009 025 678 A1 | 1/2010 |

(Continued)

OTHER PUBLICATIONS

Eugene Hecht, Optics 127 (4th ed. 2002).*

(Continued)

*Primary Examiner* — Evan P Dzierzynski
(74) *Attorney, Agent, or Firm* — Crowell & Moring LLP

(57) ABSTRACT

An illumination device is provided for a motor vehicle, including a light source consisting of a number of semiconductor diodes, and a scanner onto which a light beam produced by light of the light source falls and which modifies the position of the light beam during operation of the illumination device and thereby moves a light spot generated by the light beam at a distance from the illumination device. The moved light spot allows a predetermined light distribution to be generated. The illumination device is characterized in that a beam delimiting device, which allows the cross-section of the light beam to be delimited along a predetermined boundary, is provided between the light source and the scanner. The illumination device is designed in such a way that one or more light-shadow lines can be formed in the predetermined light distribution by way of at least one section of the predetermined boundary.

17 Claims, 2 Drawing Sheets

(51) Int. Cl.
*G02B 19/00* (2006.01)
*F21S 41/147* (2018.01)
*F21S 41/675* (2018.01)
*F21S 41/25* (2018.01)
*F21S 41/16* (2018.01)
*F21S 41/68* (2018.01)

(52) U.S. Cl.
CPC ............. *F21S 41/63* (2018.01); *F21S 41/675* (2018.01); *F21S 41/68* (2018.01); *G02B 19/0014* (2013.01); *G02B 19/0061* (2013.01); *G02B 26/101* (2013.01)

(56) References Cited

U.S. PATENT DOCUMENTS

| | | | | |
|---|---|---|---|---|
| 2005/0243237 | A1* | 11/2005 | Sasuga | F21V 14/003 349/57 |
| 2007/0177250 | A1 | 8/2007 | Duncan | |
| 2009/0046474 | A1* | 2/2009 | Sato | B60Q 1/076 362/466 |
| 2010/0027284 | A1* | 2/2010 | Ackermann | F21S 41/147 362/516 |
| 2010/0182143 | A1* | 7/2010 | Lynam | B60R 1/1207 340/465 |
| 2010/0246185 | A1* | 9/2010 | Jurik | F21V 11/10 362/282 |
| 2011/0112795 | A1* | 5/2011 | Kaneda | G01S 7/4811 702/159 |
| 2011/0249460 | A1* | 10/2011 | Kushimoto | B60Q 1/085 362/510 |
| 2012/0106188 | A1* | 5/2012 | Takahashi | F21S 48/1241 362/516 |
| 2012/0224384 | A1* | 9/2012 | Takahira | F21V 9/16 362/509 |
| 2013/0058114 | A1* | 3/2013 | Reiners | F21S 48/1136 362/510 |

FOREIGN PATENT DOCUMENTS

| | | |
|---|---|---|
| DE | 10 2010 028 949 A1 | 11/2011 |
| EP | 2 537 708 A2 | 12/2012 |
| JP | 2009-224039 A | 10/2009 |
| JP | 2010-36835 A | 2/2010 |
| JP | 2011-157022 A | 8/2011 |
| WO | WO 2010/058323 A1 | 5/2010 |
| WO | WO 2011141377 A1 * 11/2011 .......... F21S 48/1136 |  |

OTHER PUBLICATIONS

"5.3 Stops." Optics, by Eugene Hecht, 4th ed., Addison-Wesley, 2002, pp. 171-175. (Year: 2002).*
International Search Report (PCT/ISA/210) dated May 17, 2013, with English translation (Seven (7) pages).
German Search Report dated Dec. 19, 2012, with English translation (Ten (10) pages).
Chinese-language Office Action issued in counterpart Chinese Application No. 201380015917.2 dated Oct. 18, 2016 with English translation (15 pages).

* cited by examiner

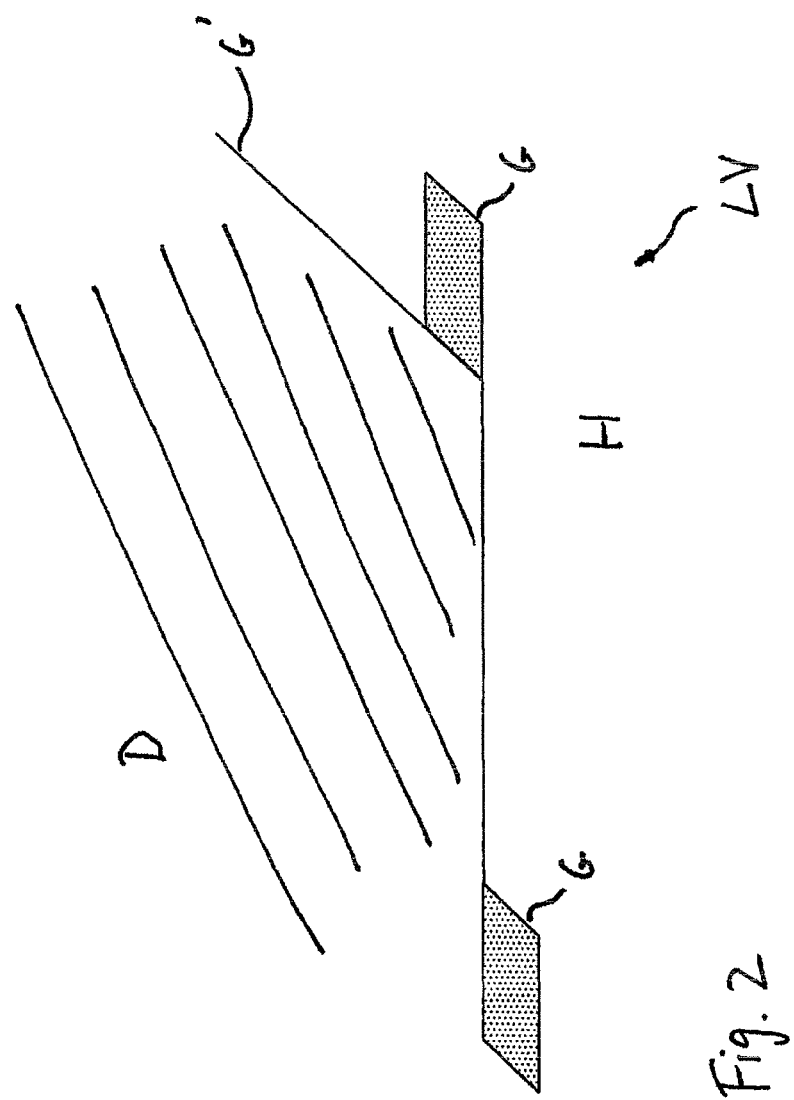

SCANNER WITH BEAM-DELIMITING DEVICE FOR VEHICLE LIGHTING

CROSS REFERENCE TO RELATED APPLICATIONS

This application is a continuation of PCT International Application No. PCT/EP2013/053688, filed Feb. 25, 2013, which claims priority under 35 U.S.C. § 119 from German Patent Application No. 10 2012 205 438.3, filed Apr. 3, 2012, the entire disclosures of which are herein expressly incorporated by reference.

BACKGROUND AND SUMMARY OF THE INVENTION

The invention relates to an illumination device for a motor vehicle including a light source constructed of a number of semiconductor diodes as well as a scanner onto which a light beam generated by light of the light source falls and which changes the position of the light beam during the operation of the illumination device and thereby moves a light spot generated by the light beam at a distance from the illumination device. A predetermined light distribution is generated by the moved light spot.

Scanning illumination systems for motor vehicles are known from the prior art, which systems use a scanner to deflect a light beam generated by means of at least one semiconductor diode to creating various light distributions.

The publication WO 2010/058323 A1 discloses a scanning illumination device for a motor vehicle, wherein monochromatic laser light falls onto a scanner with which the light distribution is generated. Located behind the scanner is a conversion element in the form of a phosphor plate with which white light is generated from the laser light. For delimiting the light distribution in the distant field, an aperture is positioned on the phosphor plate. By way of this aperture a light-dark boundary can be generated in the light distribution, which however cannot be varied.

The invention seeks to solve the problem of creating a scanning illumination device for a motor vehicle by means of which a predetermined light distribution can be generated simply and efficiently.

This problem is solved by an illumination device, according to the invention, for a motor vehicle. The illumination device includes a light source constructed of a number of semiconductor diodes as well as a scanner onto which a light beam generated by light of the light source falls and which changes the position of the light beam during the operation of the illumination device and thereby moves a light spot generated by the light beam at a distance from the illumination device. A predetermined light distribution is generated by the moved light spot. A beam-delimiting device is provided between the light source and scanner by which the cross section of the light beam is delimited along a predetermined boundary. The illumination device is designed such that one or more light-dark boundaries are formed in the predetermined light distribution by at least one segment of the predetermined boundary.

The illumination device according to the invention includes the light source constructed of a number of semiconductor diodes as well as a scanner onto which a light beam generated by the light of the light source falls and which changes the position of the light beam during operation of the illumination device and thereby moves a light spot generated by the light beam at a distance from the illumination device and, particularly, in the distant field of the illumination device. This moved light spot is used to generate a predetermined light distribution. Appropriately activating the scanner generally allows different light distributions to be generated according to application. The term "distant field" describes the light distribution at a distance from the illumination device that is significantly larger than the dimensions of the illumination device, located in particular within the range of 25 m in front of the illumination device. The term "light beam" describes a light beam consisting of light rays delimited in angle or space, where the light rays in the beam can run essentially parallel as well as diverge from or converge with one another.

The illumination device according to the invention is characterized in that positioned between light source and scanner is a beam-delimiting device with which the cross section of the light beam is delimited along a predetermined boundary. The illumination device is designed such that with at least one segment of the predetermined boundary one or more light-dark boundaries are formed in the predetermined light distribution. In other words, through the predetermined boundary that is formed in the light spot generated by the light beam, a light-dark boundary is generated in the light distribution through appropriate activation of the scanner. The predetermined boundary moves together with the light spot and facilitates in a simple manner the flexible formation of complex contrast structures in the light distribution.

The illumination device according to the invention preferably contains a laser light source. In other words, the semiconductor diodes are comprised of one or more laser diodes. In particular, the laser light source is comprised exclusively of laser diodes. The laser diodes preferably feature a maximum output of at least 1 W and, in particular, between 1.5 and 5 W.

In an especially preferred embodiment, the predetermined boundary, according to which the cross section of the light beam is delimited, includes one or more straight lines with which the light-dark boundary or the light-dark boundaries in the predetermined light distribution are formed. In a preferred variant, the predetermined boundary is a parallelogram, for example a rectangle. Guided by the directions of the edges of the parallelogram, a light-dark boundary can be generated by moving the scanner accordingly, as in the case of, for example, the low-beam characteristics of an illumination device designed as a headlight and explained below with reference to FIG. 2.

In an especially preferred embodiment, the apparatus features an aperture for beam delimitation, with the aperture opening delimiting the cross section of the light beam along the predetermined boundary. If necessary, the aperture opening can be variable to allow the predetermined boundary to be modified. The device for beam delimitation can, if necessary, be generally designed such that the predetermined boundary can be varied.

In an especially preferred embodiment, the aperture is arranged within an optical device that aims or focusses the light beam on the aperture opening and projects the light beam directed at the aperture onto the scanner. In a preferred variant, this optical device comprises at least a lens and/or at least a reflector in front of and/or at least a lens and/or at least a reflector behind the aperture.

As an alternative to or in addition to an aperture, the beam-delimiting device can also include a light conductor and, in particular, an optical fiber in which the light of the light source is conducted. In this case, the cross section of the optical fiber determines the appropriate delimitation of the light beam.

In another preferred embodiment of the invention, the light source generates monochromatic light, with a conversion element being provided for converting the light of the light source into white light. Conversion elements of this type are known from the prior art. For example, if blue/violet laser diodes having an emission wavelength of 450 nm/405 nm are present, a phosphor conversion element made of nitride phosphor, oxide nitride phosphor or cerium-doped YAG phosphor can be used to generate white light.

The conversion element, which is designed in particular as a film, can be arranged at different positions in the illumination device depending on the design of the invention, e.g. at a position before or after the light beam passes through the scanner. In an especially preferred embodiment, the conversion element is provided between the light source and scanner and, in particular, on the beam-delimiting device. If the beam-delimiting device comprises an aperture, the conversion element is preferably arranged in the aperture opening.

In another variant of the illumination device according to the invention, an exit optic is provided onto which the light beam falls after passing the scanner and which generates the light spot.

According to an advantageous design of the invention, the illumination device is designed such that the scanning speed at which the light spot is moved, the scanning path along with the light spot is moved, and/or the size of the light spot can be varied and can be controlled for generating the predetermined light distribution. The scanning path corresponds to the movement pattern of the light spot, which is generated by changing the location of the light beam. By appropriately defining the scan path, the area in which a predetermined light distribution is present can be delimited. Moreover, the luminosity in these areas can be increased accordingly through multiple delineations of the same areas according to the defined scanning path.

In a preferred design of the embodiment just described, the scanner is a vector scanner with which the scanning speed and/or the scanning path and, in particular, both the speed and the path, can be varied. In another embodiment of the invention in which a set of exit optics is provided, the size of the light spot can be varied by means of this set of exit optics. In this case the set of exit optics preferably contains a lens and/or a reflector with a variable focal distance. Optical elements of this kind are known per se and are comprised of, for example, electroactive substances that change their characteristics when electrical current is applied in such a way to vary the focal distance of the lens or the reflector.

Depending on the application, the inventive illumination device can adopt various functions. In one embodiment, the illumination device comprises a headlight. A headlight is characterized in that it actively illuminates the vicinity around the vehicle. If necessary, the illumination device according to the invention can comprise a signal light that is characterized in that it functions solely for signaling to other traffic.

In a preferred variant, the illumination device is realized as a headlight such that low-beam characteristics are generated as a predetermined light distribution during operation. This is characterized by a sharp light-dark line, which, according to the invention, can be generated by the beam-delimiting device in a simple manner. If necessary, the illumination device can also be designed such that it generates high-beam characteristics as a predetermined light distribution during operation.

In addition to the inventive illumination device, the invention also relates to a motor vehicle comprising one or more of the inventive illumination devices.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 is an example of a light distribution which can be generated with the illumination device according to the invention.

DETAILED DESCRIPTION OF THE DRAWINGS

Figure 1:
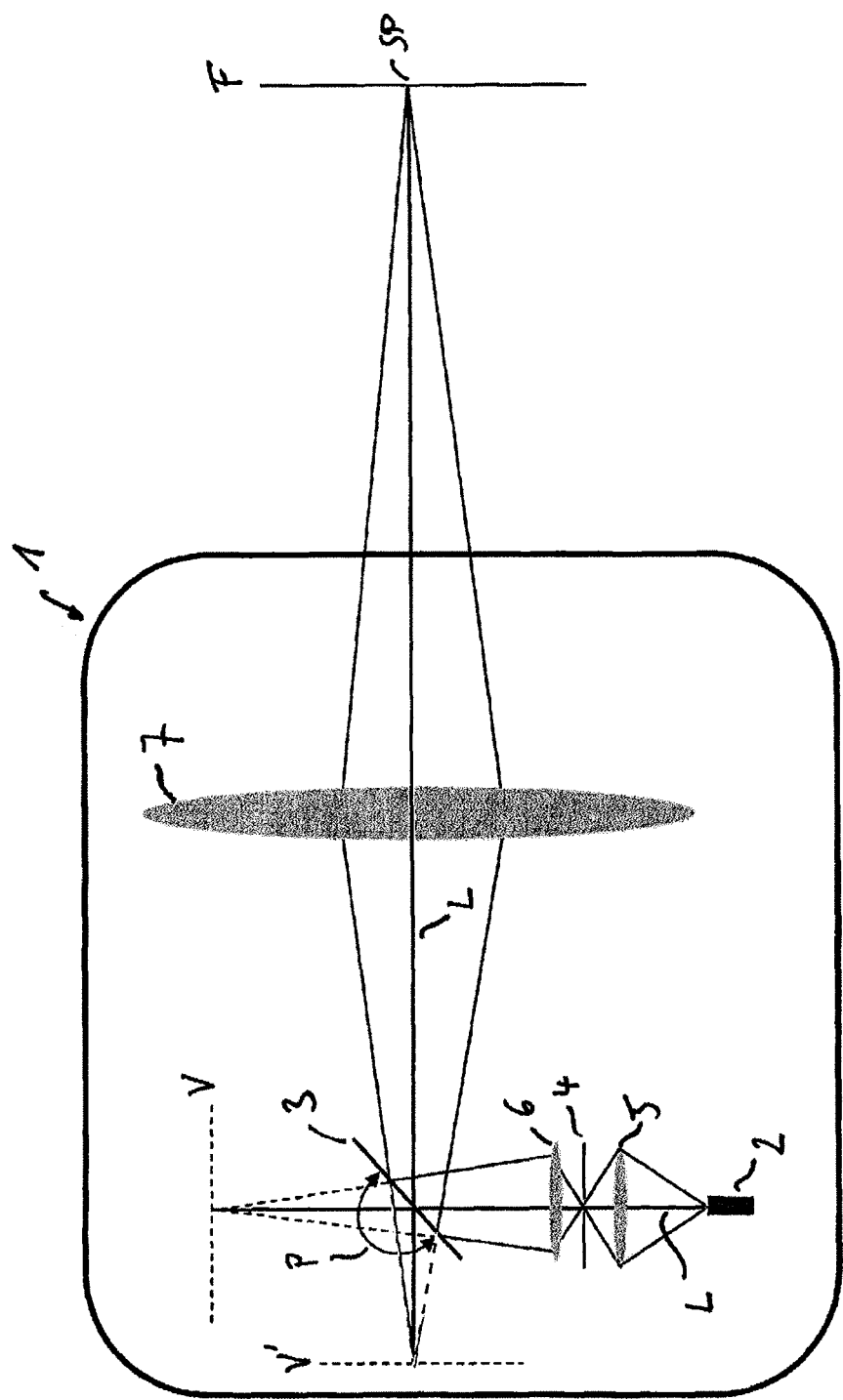
FIG. 1 is a schematic representation of an embodiment of an illumination device according to the invention.

FIG. 1 is a side view of an embodiment of an illumination device 1 according to the invention, the apparatus being a headlight installed in a motor vehicle (not shown). The illumination device includes a light source 2 with a laser diode. The emitted light of the light source is conducted in the form of a light beam through the illumination device and is finally rendered as light spot SP in the distant field F at a distance of approximately 25 m. The path of the light beam is changed over the course of its path, as depicted by the corresponding lines. The center ray of the light beam is represented by the line L. The light beam generated by the light source 2 initially passes through a lens 5 by which the light beam is focused on an aperture 4. The aperture 4 constitutes an embodiment of a "beam-delimiting device" as claimed. A predetermined shape of the cross section of the light beam is set by the aperture opening. In the embodiment described here, the opening is realized as a parallelogram, which is labeled G in the light distribution illustrated in FIG. 2.

Furthermore, provided within the aperture opening 4 is a conversion film with which the monochromatic laser light of the light source 2 is converted into white light. The aperture thus produces a white light beam delimited by the aperture opening which is directed by the lens 6 to a scanner 3. The scanner 3 is represented only schematically and includes a reflector element that can be pivoted in the plane of the drawing along the arrow P. As a result, the light spot SP can be moved vertically. The scanner 3 can also be pivoted vertically in relation to the plane of the drawing, causing the light spot SP to move horizontally. The virtual aperture image produced by lens 6 lies in the plane V represented as a dashed line.

The light beam falling onto the scanner 3 is aimed in the direction of a set of exit optics in the form of a lens 7. Due to the reflection of light on the scanner, this lens 7 reproduces the reflected, virtual aperture image lying in the plane V' represented by a dashed line, causing the light spot SP to be maintained in the distant field F. Appropriately pivoting the scanner allows the light spot to be moved in the distant field F in a suitable manner to thereby generate a desired light distribution. The scanner in this case is preferably what is referred to as a vector scanner in which the scanning speed and scanning path are controlled by way of a control device to thereby generate the appropriate light pattern. The exit optics 7 can additionally be realized as a lens with variable refractive power, thereby allowing also the size of the light spot in the distant field to be influenced through the adjustment of refractive power.

As mentioned above, the cross section of the light beam is accordingly delimited by the aperture 4, the limitation of the cross section also being present in the light spot in the rendered light distribution in the distant field. This is illustrated in FIG. 2, which, for exemplary purposes, shows a light distribution in the distant field generated by the illumination device of FIG. 1. The light distribution matches low-beam characteristics of the vehicle in which a sharp light-dark boundary G' is present. In FIG. 2 the middle of the driving surfaces is in the left area of the light distribution, and the edge of the driving surface is in the right area. According to the light-dark boundary G' the light area H of the light distribution lies beneath the boundary, while the dark area D (ruled area) lies above the boundary. The light-dark boundary runs from the center of the driving surface to the edge of the driving surface, first horizontally at a low height to avoid blinding oncoming traffic. The boundary then turns upward near the edge of the driving surface, thereby achieving good illumination of the driving surface.

FIG. 2 also shows the aforementioned parallelogram G, which is a reflection of the aperture opening rendered by the optics of the illumination device and constitutes the light spot SP. Two different positions of the parallelogram are shown as an example, which are recorded through the scanning movement of the scanner when the light distribution is generated. As one can see, the shape of the parallelogram G was selected according to the course of the light-dark boundary G'. In other words, the smaller angle between neighboring edges of the parallelogram corresponds to the angle by which the light-dark boundary turns at the edge of the driving surface. When the appropriate scanning movement is employed, the upper edge of the parallelogram G is used to generate the horizontal segment of the light-dark boundary G', while the diagonally running edge functions to generate the upward running section of the light-dark boundary G'. The directions of extension of the parallelogram were thus selected such that they delineate the lines of the light distribution to be generated along which the highest gradients are to run.

Above, the invention was described based on an embodiment having an aperture 4 and intermediate optics comprised of lenses 5 and 6, with the delimitation of the light beam being achieved through the opening of the aperture. If necessary, other components can also be used in the context of the invention to achieve a delimitation of the light beam prior to its arrival on the scanner. In particular, an appropriately shaped optical fiber can be used in place of an aperture, said optical fiber having the cross section of a parallelogram in the embodiment according to FIG. 1. The light of the light source 2 is thus delimited by the cross section of the optical fiber. An appropriate conversion element can, in turn, be arranged at the exit opening of the optical fiber to generate white light.

In another preferred embodiment, the aperture 4 can also be designed as variable to allow the shape of the aperture opening to be adapted according to the light distribution to be generated.

Furthermore, the intermediate optics illustrated in FIG. 1 are provided merely as an example. These optics can be designed is other manners or can be omitted. In addition, it is possible to arrange the conversion element in the aperture opening at a different position in the optical path. The exit optics 7 can likewise be realized differently and can be constructed of, for example, multiple lenses and/or reflectors.

The inventive embodiment described above has a series of advantages. Instead of placing an aperture in the optical path of the light beam behind the scanner, the light spot of the light distribution can even be formed by delimiting the light beam before it hits the scanner. In this case the appropriate delimitation is moved through the scanner, so that complex contrast structures in the form of sharp light-dark boundaries can thereby be generated.

LIST OF REFERENCE NUMBERS AND LETTERS

1 Illumination device
2 Light source
3 Scanner
4 Aperture
5, 6, 7 Lenses
L Light beam
P Arrow
V, V' Virtual aperture images
F Distant field
SP Light spot
LV Light distribution
G Predetermined boundary
G' Light-dark boundary
H Light area
D Dark area The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:
1. An illumination device for a motor vehicle, comprising:
a light source constructed of a number of semiconductor diodes;
a scanner onto which a light beam generated by light of the light source falls, the scanner changing position of the light beam during operation of the illumination device to move a light spot generated by the light beam at a distance from the illumination device, wherein a predetermined light distribution is generated by the moved light spot; and
a beam-delimiting device arranged in a path of the light beam between the light source and the scanner, the beam-delimiting device having an opaque portion configured to block passage of a portion of the light beam, the beam-delimiting device being configured to delimit a cross section of the light beam between the light source and the scanner along a predetermined boundary, wherein one or more light-dark boundaries are formed in the predetermined light distribution by at least one segment of the predetermined boundary,
wherein
the beam-delimiting device includes an aperture,
the cross-section of the light beam along the predetermined boundary is delimited by an opening of the aperture,
the aperture is arranged within an optical system that guides the light beam toward the aperture opening and directs the light beam from the opening onto the scanner, and
the optical system comprises a lens in front of the aperture and a lens behind the aperture.

2. The illumination device according to claim 1, wherein the number of semiconductor diodes comprises one or more laser diodes.

3. The illumination device according to claim 2, wherein the predetermined boundary comprises one or more straight lines with which one or more of the light-dark boundaries in the predetermined light distribution are formed, the predetermined boundary being a parallelogram.

4. The illumination device according to claim 1, wherein the predetermined boundary comprises one or more straight lines with which one or more of the light-dark boundaries in the predetermined light distribution are formed, the predetermined boundary being a parallelogram.

5. The illumination device according to claim 1, wherein the opening of the aperture is variable.

6. The illumination device according to claim 1, wherein the beam-delimiting device comprises an optical fiber in which light of the light source is conducted.

7. The illumination device according to claim 1, further comprising:
a conversion element for converting light of the light source into white light,
wherein the light source generates monochromatic light that is converted by the conversion element into the white light.

8. The illumination device according to claim 7, wherein the conversion element is arranged between the light source and the scanner.

9. The illumination device according to claim 8, wherein the beam-delimiting device comprises an aperture having an opening, and further wherein the conversion element is arranged in the opening of the aperture.

10. The illumination device according to claim 1, further comprising:
exit optics arranged to generate the light spot, the exit optics being arranged downstream of the scanner.

11. The illumination device according to claim 1, further comprising:
a controller configured to variably control a scanning speed with which the light spot is moved, a scanning path along which the light spot is moved and/or a size of the light spot to generate the predetermined light distribution.

12. The illumination device according to claim 11, wherein the scanner is a vector scanner with which the scanning speed and/or the scanning path is variable.

13. The illumination device according to claim 12, wherein the size of the light spot is varied via exit optics arranged downstream of the scanner.

14. The illumination device according to claim 13, wherein the exit optics comprise a lens and/or a reflector having a variable reflector power.

15. The illumination device according to claim 1, wherein the illumination device comprises a headlight and/or a signal light of the motor vehicle.

16. The illumination device according to claim 1, wherein the illumination device comprises a headlight configured such that low-beam characteristics and/or high-beam characteristics are generated as the predetermined light distribution during operation of the illumination device.

17. A motor vehicle, comprising:
one or more illumination devices, each illumination device comprising:
a light source constructed of a number of semiconductor diodes;
a scanner onto which a light beam generated by light of the light source falls, the scanner changing position of the light beam during operation of the illumination device to move a light spot generated by the light beam at a distance from the illumination device, wherein a predetermined light distribution is generated by the moved light spot; and
a beam-delimiting device arranged in a path of the light beam between the light source and the scanner, the beam-delimiting device having an opaque portion configured to block passage of a portion of the light beam, the beam-delimiting device being configured to delimit a cross section of the light beam between the light source and the scanner along a predetermined boundary, wherein one or more light-dark boundaries are formed in the predetermined light distribution by at least one segment of the predetermined boundary,
wherein
the beam-delimiting device includes an aperture,
the cross-section of the light beam along the predetermined boundary is delimited by an opening of the aperture,
the aperture is arranged within an optical system that guides the light beam toward the aperture opening and directs the light beam from the opening onto the scanner, and
the optical system comprises a lens in front of the aperture and a lens behind the aperture.

* * * * *